(12) United States Patent
Racunas, Jr.

(10) Patent No.: US 7,492,283 B1
(45) Date of Patent: *Feb. 17, 2009

(54) SYSTEMS AND METHODS FOR COMMUNICATION OF PARKING INFORMATION

(76) Inventor: Robert V. Racunas, Jr., 117 Forestwood Dr., Venetia, PA (US) 15367

( * ) Notice: Subject to any disclaimer, the term of this patent is extended or adjusted under 35 U.S.C. 154(b) by 0 days.

This patent is subject to a terminal disclaimer.

(21) Appl. No.: 11/931,100

(22) Filed: Oct. 31, 2007

Related U.S. Application Data

(63) Continuation of application No. 10/908,036, filed on Apr. 26, 2005, now abandoned, which is a continuation of application No. 10/709,565, filed on May 13, 2004, now Pat. No. 6,946,974, which is a continuation of application No. 10/065,359, filed on Oct. 8, 2002, now Pat. No. 6,750,786, which is a continuation of application No. 09/671,363, filed on Sep. 28, 2000, now Pat. No. 6,501,391.

(60) Provisional application No. 60/156,391, filed on Sep. 28, 1999.

(51) Int. Cl.
*B60Q 1/48* (2006.01)
(52) U.S. Cl. ............ 340/932.2; 340/539.1; 340/539.11; 340/539.13; 235/378; 235/384; 705/13; 705/418
(58) Field of Classification Search .............. 340/932.2, 340/539.1, 539.11, 539.13, 928, 995; 235/384; 705/13, 418
See application file for complete search history.

(56) References Cited

U.S. PATENT DOCUMENTS

| | | |
|---|---|---|
| 4,310,890 A | 1/1982 | Trehn et al. |
| 4,823,928 A | 4/1989 | Speas |
| 4,827,206 A | 5/1989 | Speas |

(Continued)

FOREIGN PATENT DOCUMENTS

AU 199953521 4/2000

(Continued)

OTHER PUBLICATIONS

Tommi Ojala and Franc Klomp, Specification of PROMISE Services, PROMISE Personal Mobile Traveller and Traffic Information Service TR1043, Jul. 1996, pp. 1-96, Deliverable D3.1, Telematics Application Programme A2, Transport.

Peter Green, Matti Karlsson, Thomas Schütt, Paul Randall and Rob Kunst, Generic PROMISE System Architecture PROMISE Personal Mobile Traveller and Traffic Information Service TR1043, Sep. 1996, pp. 1-27, Deliverable D4.1, Telematics Application Programme A2, Transport.

(Continued)

*Primary Examiner*—Daryl C Pope

(57) ABSTRACT

A parking system comprises an Internet-accessible Web server storing substantially real-time parking data associated with occupancy of a plurality of parking spaces and a plurality of detectors at a parking lot communicating with the Web server. The plurality of detectors collects substantially real-time parking occupancy data for a plurality of parking spaces at the parking lot. Each of the plurality of detectors includes a wireless communications device for transmitting said substantially real-time parking occupancy data to said Web server and one of a position detector, a motion detector, a weight detector, or a video camera to ascertain whether a parking space is occupied. The parking data is capable of being rendered by a display device running a browser application. The Web server transmits the parking data in response to a request sent from the browser application.

25 Claims, 5 Drawing Sheets

U.S. PATENT DOCUMENTS

| | | |
|---|---|---|
| 4,872,149 A | 10/1989 | Speas |
| 4,880,097 A | 11/1989 | Speas |
| 4,895,238 A | 1/1990 | Speas |
| 4,967,895 A | 11/1990 | Speas |
| 5,088,073 A | 2/1992 | Speas |
| 5,091,727 A | 2/1992 | Mahmood |
| 5,166,680 A | 11/1992 | Ganot |
| 5,266,947 A | 11/1993 | Fujiwara et al. |
| 5,339,000 A | 8/1994 | Bashan et al. |
| 5,351,187 A | 9/1994 | Hassett |
| 5,360,095 A | 11/1994 | Speas |
| 5,407,049 A | 4/1995 | Jacobs |
| 5,414,624 A | 5/1995 | Anthonyson |
| 5,432,508 A | 7/1995 | Jackson |
| 5,454,461 A | 10/1995 | Jacobs |
| 5,475,373 A | 12/1995 | Speas |
| 5,504,314 A | 4/1996 | Farmont |
| 5,570,771 A | 11/1996 | Jacobs |
| 5,617,942 A | 4/1997 | Ward, II et al. |
| 5,642,119 A | 6/1997 | Jacobs |
| 5,648,906 A | 7/1997 | Amirpanahi |
| 5,710,557 A | 1/1998 | Schuette |
| 5,710,743 A | 1/1998 | Dee et al. |
| 5,740,050 A | 4/1998 | Ward, III |
| 5,745,052 A | 4/1998 | Matsuyama et al. |
| 5,748,107 A | 5/1998 | Kersken et al. |
| 5,751,973 A | 5/1998 | Hassett |
| 5,770,845 A | 6/1998 | Hjelmvik |
| 5,777,951 A | 7/1998 | Mitschele et al. |
| 5,845,268 A | 12/1998 | Moore |
| 5,852,411 A | 12/1998 | Jacobs et al. |
| 5,877,704 A | 3/1999 | Yoshida |
| 5,903,520 A | 5/1999 | Dee et al. |
| 5,905,247 A | 5/1999 | Ilen |
| 5,910,782 A | 6/1999 | Schmitt et al. |
| 5,940,481 A | 8/1999 | Zeitman |
| 5,966,345 A | 10/1999 | Dee et al. |
| 5,980,185 A | 11/1999 | Vita |
| 6,026,367 A | 2/2000 | Hjelmvik |
| 6,037,880 A | 3/2000 | Manion |
| 6,078,272 A | 6/2000 | Jacobs et al. |
| 6,081,206 A | 6/2000 | Kielland |
| 6,097,313 A | 8/2000 | Takahashi et al. |
| 6,107,942 A | 8/2000 | Yoo et al. |
| 6,112,152 A | 8/2000 | Tuttle |
| 6,124,808 A | 9/2000 | Budnovitch |
| 6,138,072 A | 10/2000 | Nagai |
| 6,142,702 A | 11/2000 | Simmons |
| 6,147,624 A | 11/2000 | Clapper |
| 6,148,253 A | 11/2000 | Taguchi et al. |
| 6,169,897 B1 | 1/2001 | Kariya |
| 6,178,377 B1 | 1/2001 | Ishihara et al. |
| 6,195,015 B1 | 2/2001 | Jacobs et al. |
| 6,202,008 B1 | 3/2001 | Beckert et al. |
| 6,205,396 B1 | 3/2001 | Teicher et al. |
| 6,208,934 B1 | 3/2001 | Bechtolsheim et al. |
| 6,209,026 B1 | 3/2001 | Ran et al. |
| RE37,193 E | 5/2001 | Ward, II et al. |
| 6,229,455 B1 | 5/2001 | Yost et al. |
| 6,230,868 B1 | 5/2001 | Tuxen et al. |
| 6,236,337 B1 | 5/2001 | Beier et al. |
| 6,243,029 B1 | 6/2001 | Tomer |
| 6,246,337 B1 | 6/2001 | Rosenberg et al. |
| 6,249,233 B1 | 6/2001 | Rosenberg et al. |
| 6,252,523 B1 | 6/2001 | Moström |
| 6,253,980 B1 | 7/2001 | Murakami et al. |
| 6,259,991 B1 | 7/2001 | Nysen |
| 6,266,609 B1 | 7/2001 | Fastenrath |
| 6,272,332 B1 | 8/2001 | Matsumoto et al. |
| 6,275,170 B1 | 8/2001 | Jacobs et al. |
| 6,278,941 B1 | 8/2001 | Yokoyama |
| 6,282,491 B1 | 8/2001 | Bochmann et al. |
| 6,285,297 B1 | 9/2001 | Ball |
| 6,310,561 B1 | 10/2001 | Nomura et al. |
| 6,312,152 B2 | 11/2001 | Dee et al. |
| 6,333,702 B1 | 12/2001 | Hiyokawa et al. |
| 6,336,072 B1 | 1/2002 | Takayama et al. |
| 6,340,935 B1 | 1/2002 | Hall |
| 6,349,259 B1 | 2/2002 | Sato |
| 6,373,442 B1 | 4/2002 | Thomas et al. |
| 6,374,182 B2 | 4/2002 | Bechtolsheim et al. |
| 6,380,851 B1 | 4/2002 | Gilbert |
| 6,405,125 B1 | 6/2002 | Ayed |
| 6,411,895 B1 | 6/2002 | Lau et al. |
| 6,411,937 B1 | 6/2002 | Brusseaux |
| 6,421,606 B1 | 7/2002 | Asai et al. |
| 6,424,916 B2 | 7/2002 | Nysen |
| RE37,822 E | 8/2002 | Anthonyson |
| 6,434,478 B1 | 8/2002 | Ikeda |
| 6,434,479 B1 | 8/2002 | Kondou et al. |
| 6,437,692 B1 | 8/2002 | Petite et al. |
| 6,453,235 B1 | 9/2002 | Endo et al. |
| 6,481,622 B2 | 11/2002 | Hjelmvik |
| 6,484,205 B1 | 11/2002 | Byford |
| 6,490,443 B1 | 12/2002 | Freeny, Jr. |
| 6,493,676 B1 | 12/2002 | Levy |
| 6,501,391 B1 | 12/2002 | Racunas, Jr. |
| 6,502,011 B2 | 12/2002 | Haag |
| 6,505,774 B1 | 1/2003 | Fulcher et al. |
| 6,519,329 B1 | 2/2003 | Hjelnvik |
| 6,519,528 B2 | 2/2003 | Endo et al. |
| 6,526,285 B1 | 2/2003 | Matsumoto et al. |
| 6,553,308 B1 | 4/2003 | Uhlmann et al. |
| 6,553,336 B1 | 4/2003 | Johnson et al. |
| 6,636,145 B1 | 10/2003 | Murakami et al. |
| 6,647,270 B1 | 11/2003 | Himmelstein |
| 6,650,999 B1 | 11/2003 | Brust et al. |
| 6,715,673 B2 | 4/2004 | Fulcher et al. |
| 6,742,037 B1 | 5/2004 | Hall et al. |
| 6,750,786 B1 | 6/2004 | Racunas, Jr. |
| 6,807,571 B2 | 10/2004 | Hatano et al. |
| 6,823,317 B1 | 11/2004 | Ouimet et al. |
| 6,946,974 B1 | 9/2005 | Racunas, Jr. |
| 2004/0012506 A1 | 1/2004 | Fujiwara et al. |

FOREIGN PATENT DOCUMENTS

| | | |
|---|---|---|
| DE | 29909002 | 9/1999 |
| EP | 0646897 | 4/1995 |
| EP | 0816802 | 1/1998 |
| FR | 2600448 | 12/1987 |
| JP | 1995 07-021426 | 1/1995 |
| JP | 1995 07-072234 | 3/1995 |
| WO | WO9301567 | 1/1993 |
| WO | WO9320539 | 10/1993 |
| WO | WO9634366 | 10/1996 |
| WO | WO9713222 | 4/1997 |
| WO | WO9719568 | 5/1997 |
| WO | WO9737328 | 10/1997 |
| WO | WO9815075 | 4/1998 |
| WO | WO9845823 | 10/1998 |
| WO | WO9849654 | 11/1998 |
| WO | WO9849665 | 11/1998 |
| WO | WO9910844 | 3/1999 |
| WO | WO9922348 | 5/1999 |
| WO | WO9930284 | 6/1999 |
| WO | WO9930290 | 6/1999 |
| WO | WO9948062 | 9/1999 |
| WO | WO0000942 | 1/2000 |
| WO | WO0008484 | 2/2000 |
| WO | WO002394/9 | 4/2000 |
| WO | WO0041142 | 7/2000 |
| WO | WO0046068 | 8/2000 |
| WO | WO0055816 | 9/2000 |

| WO | WO0059201 | 10/2000 |
| WO | WO0120558 | 3/2001 |
| WO | WO0141029 | 7/2001 |

OTHER PUBLICATIONS

Johnson City Med-Tech Corridor ITS Project, *Geographic Information Systems (GIS) Phase I Review and Phase II Prospectus*, Oct. 1996, available at http://www.itsdocs.fhwa.dot.gov. %5CJPODOCS%5CREPTS_TE/L401!.PDF.

Bikash Ron Pati, *Evaluation of Parking Guidance Systems: A Unique Approach*, 1997, FLITE, available at http://uftrc.ce.ufl.edu/fsite/pati.htm.

Mitsui & Co Ltd., *Mitsui and Park 24 Establish Tie-Up For Providing Information on Parking Lots and Plan to Offer Related Information on a Real-Time Basis*, Jan. 1997 Press Release, availalbe at http://www.mitsui.co.jp/tkabz/english/news/1997/971park.htm.

Jérome Hénique, Evaluation Plan, PROMISE Personal Mobile Traveller and Traffic Information Service TR1043, Apr. 1997, pp. 1-100, Deliverable D7.1, Telematics Application Programme A2, Transport.

European Commission, *West European Local Legal Arrangements for Transport Information and Exchange of Data*, Apr. 1998, available at http://www.rupprecht-consult.de/wtforeport.pdf and http://www.rupprecht-consult.de/wtfnreport.pdf.

Winfried Krux, Peter Hasberg, and Klaus Overkamp, *Cologne ParkInfo A Contribution to Traffic Control Compatible with Environment and Urban Development*, Presentation on the 5$^{th}$ ITS World Congress, Oct. 1998, available at http://152.99.123.29/cdrom/2147.pdf.

Namgeun Jeong, Youngsu Chae, Aparna Pappu, Shashidhar Merugu, and Ramkumar Krishnan, EZPark/RANSY Project, Oct. 1998, available at http://www.cc.gatech.edu/classes/cs6751_98_fall/projects/RANSY/.

ITS, *Parking Information-Osaka City: Parking space guidance system*, ITS Handbook 1998, Section 4: ITS Toward:Standard Deployment, available at http://www.its.go.jp/ITS/1998HBook/chapter4/4-8e.html.

*Real Time Traffic Information Systems*, Published as a Supplement to H&T, Mar. 1998.

Amano Cincinnati, Inc., TruParc™ Parking Management Software, 1998, pp. 1-8, available at http://www.beehiveparking.com/brochures/amanoparking/truparb.pdf.

Federal APD, Inc., Federal APD, Inc. Introduces New Central Management System Software for Parking, 1998, available at http://www.federalapd.com/company/press/1998/ScanNT.htm.

Federal APD, Inc.,Using Scan NT Version 4.0.0, 1999, pp. 1-336, available at http://www.federalapd.com/PRODUCTS/manuals/scnt_manual_400.pdf.

Tommi Ojala, Peter Green, Ian Bonner and Edwin Bastiaensen, Final Evaluation Report of PROMISE Demonstrations, PROMISE Personal Mobile Traveller and Traffic Information Service TR1043, Jan. 1999, pp. 1-142, Deliverable D7.4, Telematics Application Programme A2, Transport.

Paul Randall, Peter Green, Thomas Schütt, Edwin Bastiaensen, Jan De Jong, Timo Horelli, Tommi Ojala and Xavier Mirabaud, The Business Case for PROMISE Services, PROMISE Personal Mobile Traveller and Traffic Information Service TR1043, Jan. 1999, pp. 1-74, Deliverable D8.1, Telematics Application Programme a2, Transport.

Tommi Ojala and Aki Lumiaho, Summary of PROMISE Public Relations Activities, PROMISE Personal Mobile Traveller and Traffic Information Service TR1043, Feb. 1999, pp. 1-39, Deliverable D2.1, Telematics Application Programme A2, Transport.

Tommi Ojala and Aki Lumiaho, Final Report TR1043, PROMISE Personal Mobile Traveller and Traffic Information Service, Feb. 1999, pp. 1-26, Telematics Application Programme Transport.

Jürgen Grotepass, Final Validation Plan, Project EUROSCOPE (TR1023), Mar. 1999, vol. I, pp. 1-182, Deliverable No. 11, 4th Framework Programme Telematics Applications Programme Transport Sector.

Jürgen Grotepass, Final Validation Plan, Project EUROSCOPE (TR1023), Mar. 1999, vol. II, pp. 1-154, Deliverable No. 11, 4th Framework Programme Telematics Applications Programme Transport Sector.

Jürgen Grotepass, Evaluation Results and Comparative Assessment, Project EUROSCOPE (TR1023), Apr. 1999, pp. 1-6, Deliverable No. 15, 4th Framework Programme Telematics Applications Programme Transport Sector.

Brelis, M., Logan Airport Unveils State-of-the-Art Web Page, Boston Goble, Jun. 1999, p. 1-2, available at http://www.netnumina.com/AboutUs/Press/articles/logan.html.

Mateyaschuk, J., Internet Aids State travel, InformationWeek Online, Jun. 1999, p. 1-2, available at http://www.informationweek.com/737/numina.htm.

Meserve, J., Massport goes high tech, NetworkWorldFusion, Aug. 1999, p. 1-2, available at http://www.nwfusion.com/news/1999/0823massport.html.

Federal APD, Inc., Real-Time Count Status Signs Interface with Federal APD Scan NT System, 1999, available at http://www.federalapd.com/company/press/1999/pr080299b.htm.

Kalin, S., Boston's Massport Site Keeps Things Moving, CIO Magazine, Sep. 1999, available at http://www.cio.com/archive/webbusiness/090199_redesign.html.

Epic Data International, Inc., Epic Data Announces Real Data Systems Gives City of Vancouver the Edge on Parking Enforcement, 1999 Press Release, available at http://ww2.cdn-news.com/scripts/cnn-release.pl?/1999/09/27/0927010n.html.

Epic Data International, Inc., Epic Data Releases Java(™) and XML-Based Wireless Application For SAP(™) R/3 (R), 1999 Press Release, available at http://ww2.cdn-news.com/scripts/cnn-release.pl?/1999/12/16/1216100n.html.

Nikos I. Leoutsarakos, *Management Technology for the Private Parking Industry, Urban Mobility Professional*, Jan. 1999, Issue 7, available at http://docs.vircomnet.com/Mobility/parking_vc/leoutsarakos0002.htm.

Nikos I. Leoutsarakos, *Parking On Street Goes Wireless*, Urban Mobility Professional, Jan. 1999, Issue 7, available at http://docs.vircomnet.com/Mobility/parking_vc/leoutsarakos0002.htm.

APCOA/Standard Parking, Technology Newsletter, Jan. 2000, pp. 1-7, available at http://www.standardparking.com/technology_nl.html.

Keith Gavin, *Parking Guidance Comes of Age*, Urban Mobility Professional, Jan. 1999, Issue 7, available at http://docs.vircomnet.com/mobility/parking_vc/Papers_Full_Documents_K.Gavin_0001_0001.htm.

Jek Kian Jin, *Driver Upgrades*, Life! Section of Straits Times, Jun. 1999, *available at* http://www.best.com/~kianjin/sv-life/sv-erpcam.html.

Jürgen Grotepass, Evaluation Results and Comparative Assessment (Phase I), Project EUROSCOPE (TR1023), Apr. 1999, pp. 1-89, Deliverable No. 15-Part I, 4th Framework Programme Telematics Applications Programme Transport Sector.

Jürgen Grotepass, Evaluation Results and Comparative Assessment (Phase I), Project EUROSCOPE (TR1023), Apr. 1999, pp. 1-237, Deliverable No. 15-Part II, 4th Framework Programme Telematics Applications Programme Transport Sector.

Ford Motor Company, *Ford takes the stress out of city driving*, Jun. 1999, available at http://www.media.ford.com/article_display.cfm?article_id=1914.

Webraska, *Alcatel va intégrer la technologie de Webraska pour fournir des services de cartographie aux utilisateurs de GSM*, Jul. 1999, available at http://www.webraska.com/press/99-jul-l-fr.html.

MOBIC: *Alcatel and Webraska Partner to Provide Location-Based Services to GSM Users*, Jul. 1999, available at http://www.mobic.com/news/9907/alacatel_and_webraska_partner_to_.htm.

Andrew Ryder, *No Place To Park*, Heavy Duty Trucking, Jul. 1999, available at http://www.heavytruck.com/hdt/1999/07/020a9907.html.

Dr. Andreas Scholtz, *Parking Technology Beyond the Year 2000*, Oct. 1999, available at http://docs.vircomnet.com/mobility/parking_vc/Andreas_Scholtz.doc and http://www.parking-net.com.

Jürgen Grotepass, *Project Recommendations EUROSCOPE Book*, Project EUROSCOPE (TR1023), Oct. 1999, pp. 1-123, Deliverable No. 16, 4th Framework Programme Telematics Applications Programme Transport Sector.

NETSYSTEC GMBH, *Video Broadcast System for Providers*, Nov. 25, 1999 Press Release available at http://www.netsystec.com/engl/presse/artikel/VS16_PowerEngine.htm.

Peter Hasberg and Dr. Dirk Serwill, *The Stadtinfokoln Project in Cologne Information as the Key to Mobility and Traffic Management*, ECMT/OECD, Dec. 1999.

NETSYSTEC GmbH, *Video Shuttle by NETSYSTEC being used in Cologne's Traffic Information Service* www.koehnverkehr.de, Dec. 25, 1999 Press Release available at http://www.netsystec.com/engl/presse/artikel/VS16_koelnverkehr.htm.

English translation of German web site http://www.koelnverkehr.de available at http://translate.google.com/translate?hl=en&sl=de&u=http://www.koelnverkehr.de/&prev=/search%3Fq%3Dkoelnverkehr%26hl%3Den%26safe%3Doff.

Shark Byte Systems, Inc., *New Revenue System Runs Exclusively on the Net*, Parking Today, Mar. 2000 Press Release, available at http://www.sharkbytesystems.com/press/1.htm.

Schlumberger, *Schlumberger and Webraska Partner Up for World's First Demonstration of Hassel-free Parking Using WAP Mobile Phones*, Mar. 2000 Press Release, available at http://www.slb.com/print_pr.cfm?prid=1321&printable=1.

Shark Byte Systems, Inc., *The Internet Revolution Comes to Parking*, Parking, Apr. 2000 Press Release, available at http://www.sharkbytesystems.com/press/2.htm.

http://www.parking.org/cgi-bin/rbox/get/forums/software.html, hardcopy printout, pp. 1-4.

http://www.parking.org/cgi-bin/rbox/get/forums/software/20.html, hardcopy printout, p. 1.

http://www.parking.org/cgi-bin/rbox/get/forums/software/20/1.html, hardcopy printout, p. 1.

http://www.parking.org/cgi-bin/rbox/get/forums/software/20/1.html hardcopy printout, p. 1.

http://www.tele-parking.com, pp. 1-42.

SYSTEMS AND METHODS FOR COMMUNICATION OF PARKING INFORMATION

CROSS REFERENCE TO RELATED APPLICATIONS

This application is a continuation of U.S. patent application Ser. No. 10/908,036, filed on Apr. 26, 2005, which is a continuation of U.S. patent application Ser. No. 10/709,565, filed on May 13, 2004, which issued as U.S. Pat. No. 6,946,974 on Sep. 20, 2005, which is a continuation of U.S. patent application Ser. No. 10/065,359, filed on Oct. 8, 2002, which issued as U.S. Pat. No. 6,750,786 on Jun. 15, 2004, which is a continuation of U.S. patent application Ser. No. 09/671,363, filed on Sep. 28, 2000, which issued as U.S. Pat. No. 6,501,391 on Dec. 31, 2002 and claims priority to U.S. provisional patent application Ser. No. 60/156,391 filed on Sep. 28, 1999. These applications are entirely incorporated by reference.

TECHNICAL FIELD

The present invention relates generally to systems and methods for communication of parking information.

BACKGROUND

Locating a vacant parking space is an ordeal that causes frustration for many commuters. Even if a commuter pays to enter a parking lot, valuable time is consumed searching for a parking space within the parking lot. It seems that parking lots that service hospitals, airports, mass transit stations, entertainment forums, shopping malls and the like are always the most crowded, when time is the most crucial. As urban and suburban regions become more populated, finding a vacant parking space will become increasingly difficult for commuters.

Several prior art devices have attempted to facilitate locating a parking space. In particular, U.S. Pat. No. 5,293,163 to Kakihara et al. ('163 patent) discloses a system for locating garages with available parking spaces. According to the '163 patent, the location of a parking garage having available parking is displayed in map format.

U.S. Pat. No. 5,432,508 to Jackson ('508 patent) discloses a technique for informing vehicle operators of available parking spaces in a parking garage. According to the '508 patent, light sources mounted above the parking spaces and at the entrance to the parking garage are used to indicate the location of available spaces. The '508 patent also discloses a computer which collects information concerning parking availability and communicates the information to prospective users. Namely, a person can place a telephone call and receive a voice message indicating whether the parking lot is full.

U.S. Pat. No. 5,910,782 to Schmitt et al. ('782 patent) discloses a system for finding available on-street parking using an on-board vehicle navigation system and parking meters equipped with sensing devices. According to the '782 patent, real time metered parking space information can be accessed from a central location or directly by a vehicle, upon entering a specific geographic area.

U.S. Pat. No. 5,940,481 to Zeitman ('481 patent) discloses a parking management control system used to report parking, monitor parking and reserve parking spaces. According to the '481 patent, a user reports parking in a particular parking facility to a central control unit using a personal non-dedicated mobile communications device. The central control unit then confirms whether parking in the particular parking facility is authorized or not. The central control unit also generates a report indicating which parking facilities are supposed to be vacant for law enforcement officials so that unauthorized parking can be ticketed. The '481 patent also discloses that a user can reserve a desired parking facility by selecting a desired parking facility from a map provided from the central control unit. If a potential user, other than the registered user, communicates a request to park in the reserved parking facility, the control unit transmits a response to the potential user indicating that the parking facility is reserved and not authorized for use.

SUMMARY

A parking system comprises an Internet-accessible Web server storing substantially real-time parking data associated with occupancy of a plurality of parking spaces and a plurality of detectors at a parking lot communicating with the Web server. The plurality of detectors collects substantially real-time parking occupancy data for a plurality of parking spaces at the parking lot. Each of the plurality of detectors includes a wireless communications device for transmitting said substantially real-time parking occupancy data to said Web server and one of a position detector, a motion detector, a weight detector, or a video camera to ascertain whether a parking space is occupied. The parking data is capable of being rendered by a display device running a browser application. The Web server transmits the parking data in response to a request sent from the browser application.

A method comprises collecting substantially real-time parking occupancy data for a plurality of parking spaces at a parking lot using a plurality of detectors the parking lot and communicating the substantially real-time parking occupancy data to an Internet-accessible Web server. Each of the plurality of detectors includes a wireless communications device for transmitting the substantially real-time parking occupancy data and one of a position detector, a motion detector, a weight detector, or a video camera to ascertain whether a parking space is occupied. The Web server stores substantially real-time parking data associated with occupancy of the plurality of parking spaces. The parking data is capable of being rendered by a display device running a browser application. The Web server provides the parking data to the display device in response to a receiving request sent from the browser application.

Aspects of the present invention may be implemented by an apparatus and/or by a computer program stored on a computer readable medium. The computer readable medium may comprise a disk, a client device, a network device, a host device, and/or a propagated signal.

Other features and advantages will be apparent from the following description, including the drawings, and from the claims.

DETAILED DESCRIPTION

Figure 1:
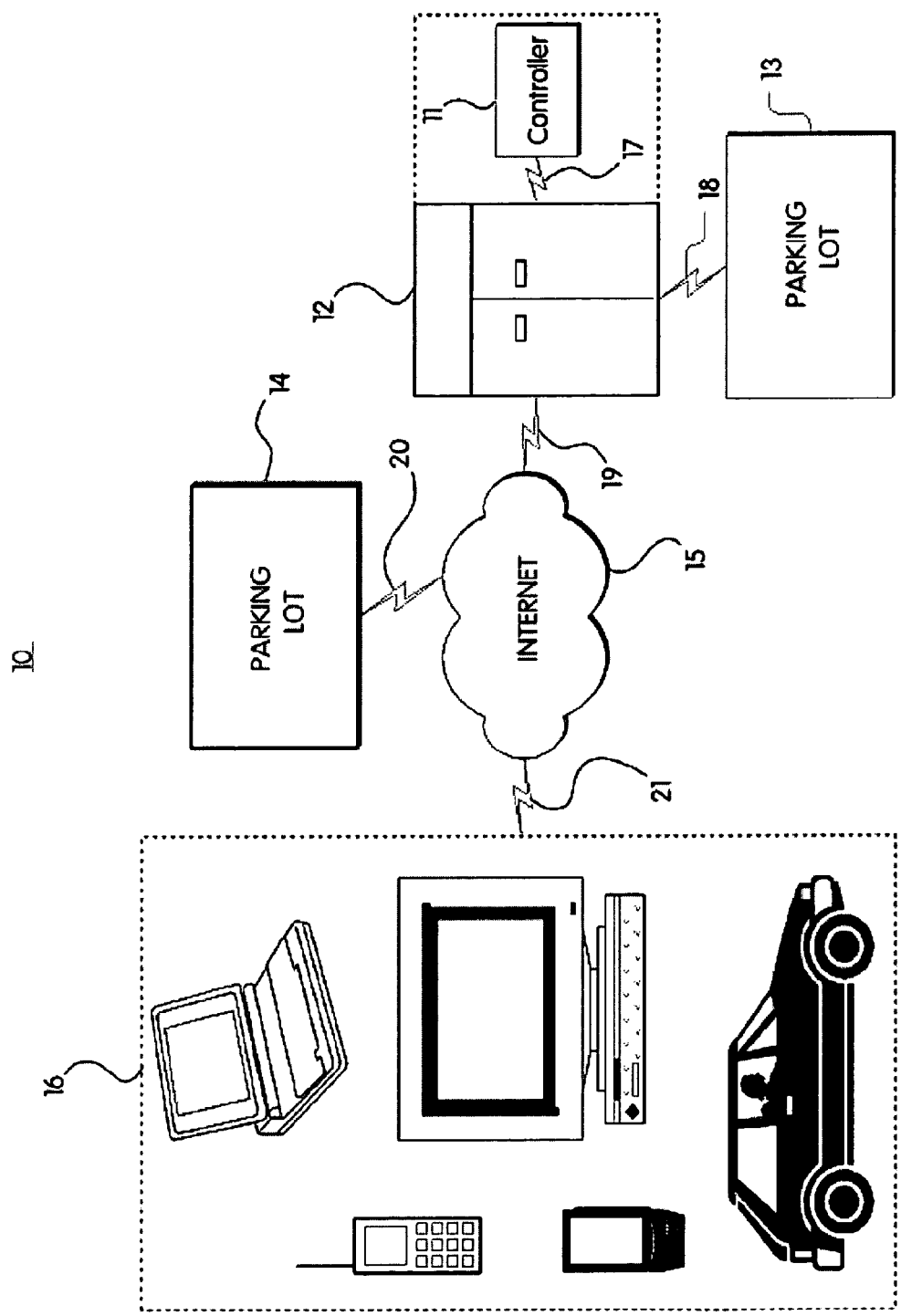
FIG. 1 is a block diagram of a communication network.

FIG. 1 illustrates a communication network 10 according to one embodiment of the present invention. The communication network includes a controller 11 for commanding a server 12 to transmit parking lot occupancy data corresponding to one or more parking lots 13, 14 through the Internet 15. For simplicity, only the basic components of the communication network 10 are shown. However, as would be understood by one of ordinary skill in the art, the communication network may include various other components and structures in actual implementation. For instance, although a first parking lot 13 and a second parking lot 14 are shown, the communication network may include only one parking lot or numerous parking lots.

The server 12 may be any type computer, computer system, server, settop box or other type of Internet-accessible device and may include any type of hardware, software, application and/or program capable of functioning as described herein. The server 12 may be located at the site of one or more of the parking lots 13, 14 and/or may be located at a remote location.

As indicated by the broken lines, the controller 11 may be either internal or external to the server 12. An example a controller 11 is a software application loaded on the server 12 for commanding and directing communications enabled by the server 12. Other examples include a program, a piece of code, an instruction, a device, a computer, a computer system, and/or a combination thereof, for independently or collectively instructing the server 12 to interact and operate as described herein. The controller 11 may be embodied permanently or temporarily in any type of machine, component, and/or equipment. The controller 11 transmits commands to the server 12 through a first connection 17, which may be any communication path capable of carrying commands between the controller 11 and the server 12.

As shown in FIG. 1, the server 12 is connected to the first parking lot 13 through a second connection 18. The second connection may be a serial, modem, telephone, cable, satellite, LAN (Local Area Network) including one or more other computers (not shown) or any other connection capable of carrying data between the first parking lot 13 and the server 12. The server 12 also is connected to the second parking lot 14 through the Internet 15 through a third connection 19 and a fourth connection 20. The third connection 19 and the fourth connection 20 may be any type of modem, cable, satellite or other type of connection capable of carrying data through the Internet 15 between the second parking lot 14 and the server 12. Each of the third connection 19 and fourth connection 20 may also include one or more intermediary computer systems or servers (not shown), such as an ISP (Internet Service Provider).

The first parking lot 13 and the second parking lot 14 may be any parking lot that services a hospital, airport, mass transit station, entertainment forum, shopping mall, department store, grocery store or the like. Each of the first parking lot 13 and the second parking lot 14 are equipped with detectors (not shown) for detecting the status information for each of the parking lots 13,14. The detectors may be any type of device (e.g., position detectors, motion detectors, weight detectors, video cameras, etc.) capable of ascertaining whether a parking space is occupied or not. The detected status information includes at least the location of vacant parking spaces within the parking lots 13, 14. The status information, however, may include the occupancy status of every parking space within the parking lots 13, 14 or any other information concerning the status of the parking lots 13,14. The first parking lot and second parking lot are also equipped with communication devices (not shown) for communicating the status information to the server 12. The communications devices may be any type of internal or external device such as a computer, server, application, and/or program capable of conveying the status information to the server 12. For example, the communication devices may be the detectors of the parking lots 13, 14 or may be a terminal at the parking lots 13, 14 for collecting and communicating status information.

Referring again to FIG. 1, the server 12 is connected to a remote display device 16 through the Internet 15 through the third connection 19 and a fifth connection 21. The fifth connection 21 may be any type of modem, cable, satellite or other type of connection capable of carrying data through the Internet 15 between the server 12 and the remote display device 16.

The remote display device 16 may be any type computer, computer system, server, settop box or other type of Internet-accessible device and may include any type of hardware, software, application or program capable of executing the functions described herein. The display device 16 may include applications that enable textual or graphical display of information, such as an email application or an Internet browser application. The remote display device 16 may be a wired or wireless device structured and arranged to access the Internet from home, office, vehicle, and/or any other location. For example, the remote display device 16 may be personal computer (PC) and/or a portable device, such as a vehicle-mounted device or a hand-held device (e.g., PDA and/or mobile telephone having Internet access). The remote display device 16 may communicate with the server 12 through the Internet 15 and through wired or wireless communication pathways 19, 21.

Figure 2:
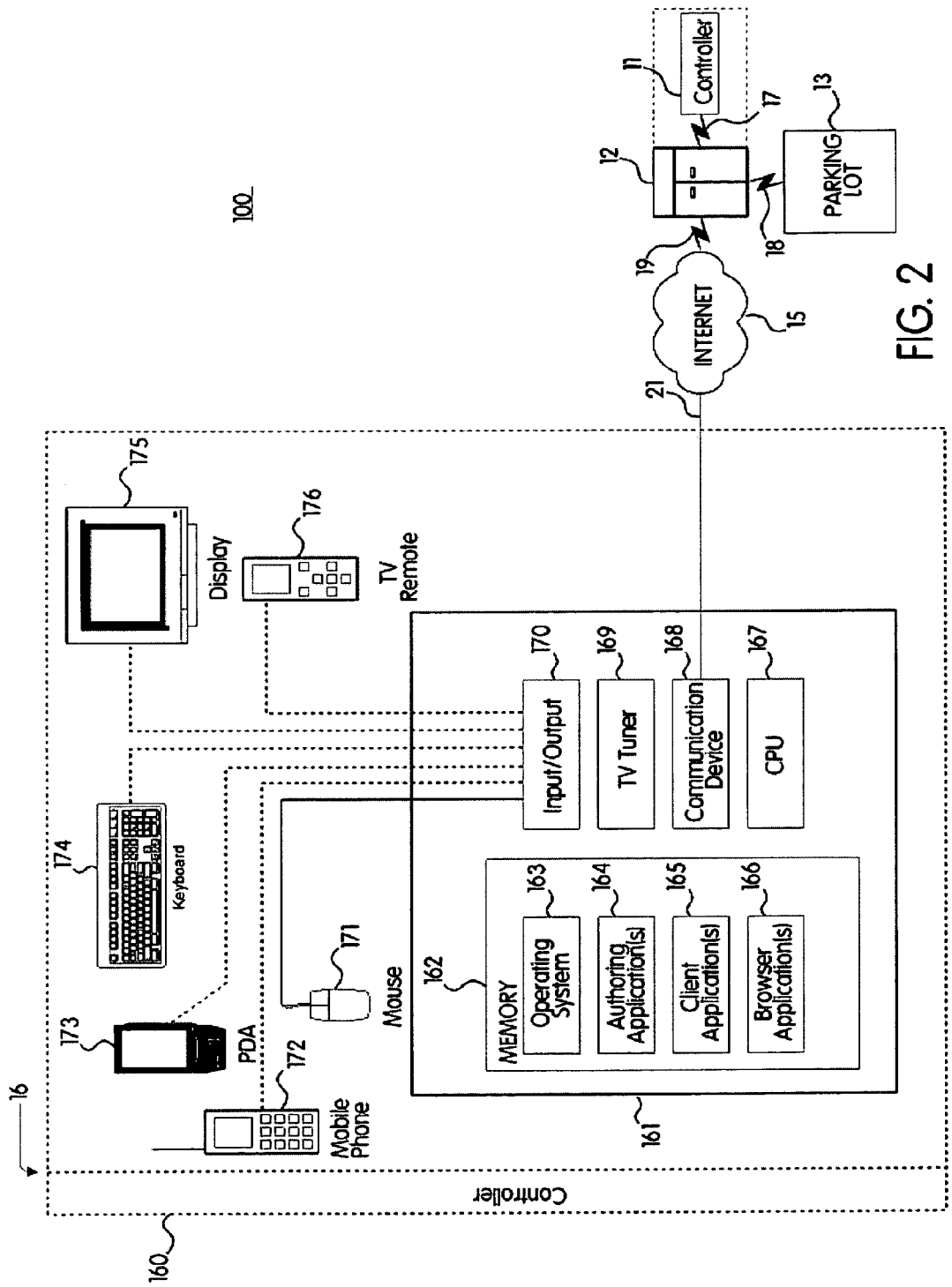
FIG. 2 is an expansion of the block diagram of FIG. 1.

FIG. 2 illustrates a communication network 100 including a display device 16 communicating with a server 12 through the Internet 15. The server 12 may include one or more server controllers 11 for controlling the server 12. Communication pathway 19 and communication pathway 21 enable wired or wireless communication between the server 12 and the display device 16 through the Internet 15.

The display device 16 may include one or more device controllers 160 for controlling the display device 16. An example of device controller 160 is a software application loaded on the display device 16 for commanding and directing communications enabled by the display device 16. Other examples include a program, a piece of code, an instruction, a device, a computer, a computer system, or a combination thereof, for independently or collectively instructing the display device 16 to interact and operate as described herein. The device controller 160 may be embodied permanently or temporarily in any type of machine, component, equipment, storage medium, or propagated signal capable of providing instructions to the client device 16.

In one implementation, the display device 16 is a PC and/or a portable device, such as a vehicle-mounted device or a hand-held device (e.g., PDA and/or mobile telephone). The display device 16 includes a general purpose computer 161 having an internal or external storage 162 for storing data and programs such as an operating system 163 (e.g., DOS, Windows™, Windows 95™, Windows 98™, Windows 2000™, Windows NT™, OS/2, or Linux) and one or more application programs. Examples of application programs include authoring applications 164 (e.g., word processing, database programs, spreadsheet programs, or graphics programs) capable of generating documents or other electronic content; client applications 165 capable of communicating with other computer users, accessing various computer resources, and viewing, creating, or otherwise manipulating electronic content; and browser applications 166 (e.g., Netscape's Navigator or Microsoft's Internet Explorer) capable of rendering standard Internet content.

The general-purpose computer 161 also includes a central processing unit (CPU) 167 for executing instructions in response to commands from the device controller 160. In one implementation, the device controller 160 includes one or more of the application programs installed on the internal or external storage 162 of the general-purpose computer 161. In another implementation, the device controller 160 includes application programs externally stored in and performed by one or more device(s) external to the general-purpose computer 160.

The general-purpose computer typically will include a communication device 168 for sending and receiving data. One example of the communication device 168 is a modem. Other examples include a transceiver, a set-top box, a communication card, a satellite dish, an antenna, or another network adapter capable of transmitting and receiving data over wired or wireless data pathway 21. The general-purpose computer 161 also may include a TV ("television") tuner 169 for receiving television programming in the form of broadcast, satellite, and/or cable TV signals. As a result, the display device 16 can selectively and/or simultaneously display Internet content received by communications device 168 and television programming content received by the TV tuner 169.

The general-purpose computer 161 may include an input/output interface 170 for wired or wireless connection to various peripheral devices. Examples of peripheral devices include, but are not limited to, a mouse 171, a mobile phone 172, a personal digital assistant 173 (PDA), a keyboard 174, an on-board vehicle or PC display monitor 175 with or without a touch screen input, and/or a TV remote control 176 for receiving information from and rendering information to subscribers.

Although FIG. 2 illustrates devices such as a mobile telephone 172, a PDA 173, and a TV remote control 176 as being peripheral with respect to the general-purpose computer 161, in another implementation, such devices may include the functionality of the general-purpose computer 161 and operate as the display device 16. For example, the mobile phone 172 or the PDA 173 may include computing and networking capabilities and function as a display device 16 by accessing the Internet 15 and communicating with the server 12. Furthermore, the display device 16 may include one, some or all of the components and devices described above.

Figure 3:
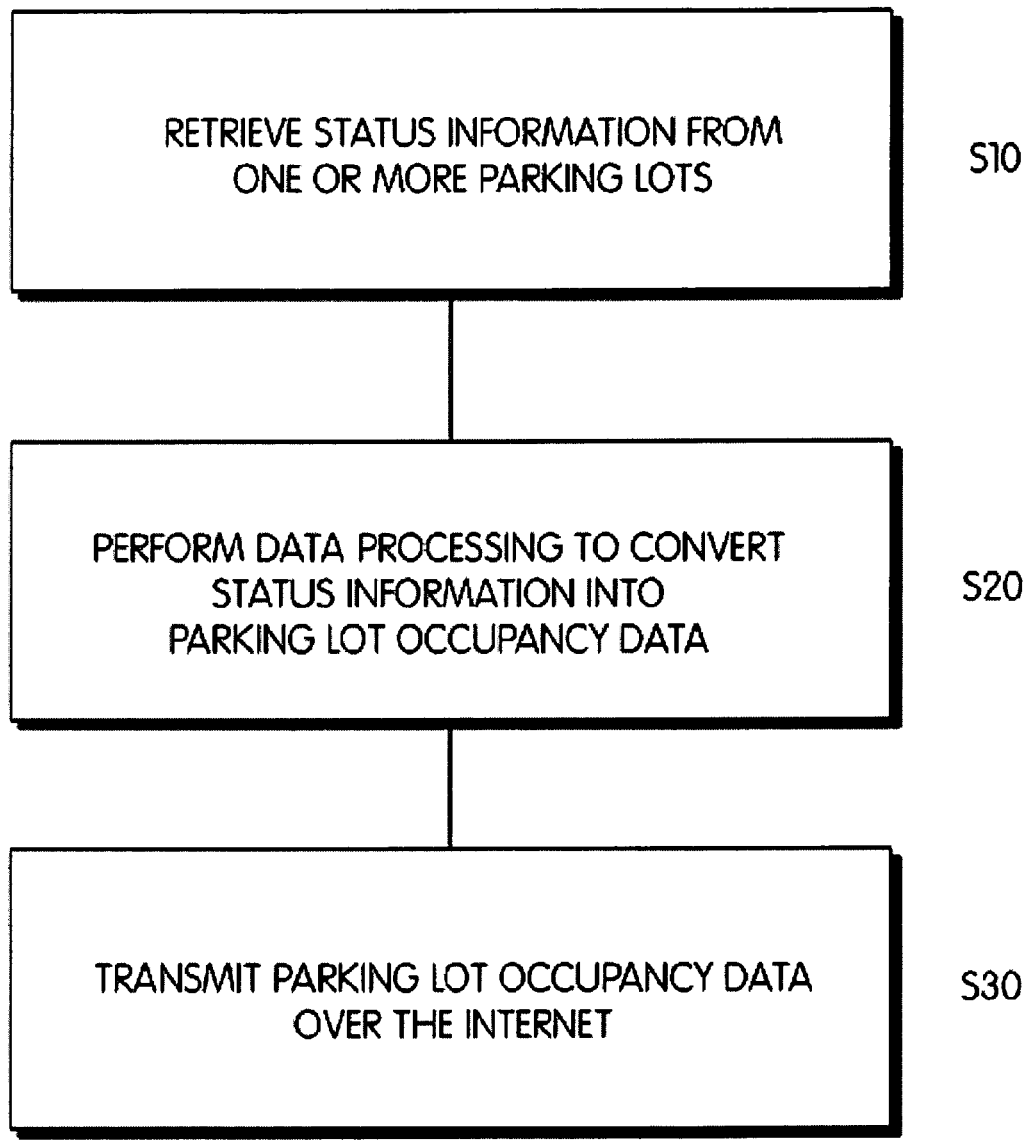
FIG. 3 is a flow chart of a communications method.

The operation of one implementation of the present invention will now be described with reference to FIG. 3.

In response to commands from the controller 11, the server 12 retrieves status information from one or more of the parking lots 13, 14 (S10). This may entail the controller 11 commanding the server 12 to poll or query the occupancy status of the parking lots 13, 14 or commanding the server 12 to accept status information periodically sent from the parking lots 13, 14.

After the server 12 has retrieved the status information, the controller 11 instructs the server 12 to perform data processing in order convert the status information into parking lot occupancy data capable of being reproduced by a remote display device 16 (S20). Such data processing may or may not be required depending on the form of the retrieved status information.

The controller 11 then commands the server 12 to transmit the parking lot occupancy data over the Internet 15 (S30). The parking lot occupancy data corresponds to one or more of the parking lots 13, 14 and is capable of being reproduced by a remote display device 16 as a real-time representation of the parking lot 13, 14 indicating vacant parking spaces within the parking lots 13, 14. The real-time representation may be in the form of a textual listing, a graphical map, a video image, an Internet Web page or similar form and may indicate occupied parking spaces as well as reserved parking spaces.

Using a remote display device, a commuter can view the real-time representation of the parking lot and can readily locate an available parking space or decide to search for parking elsewhere.

Figure 4:
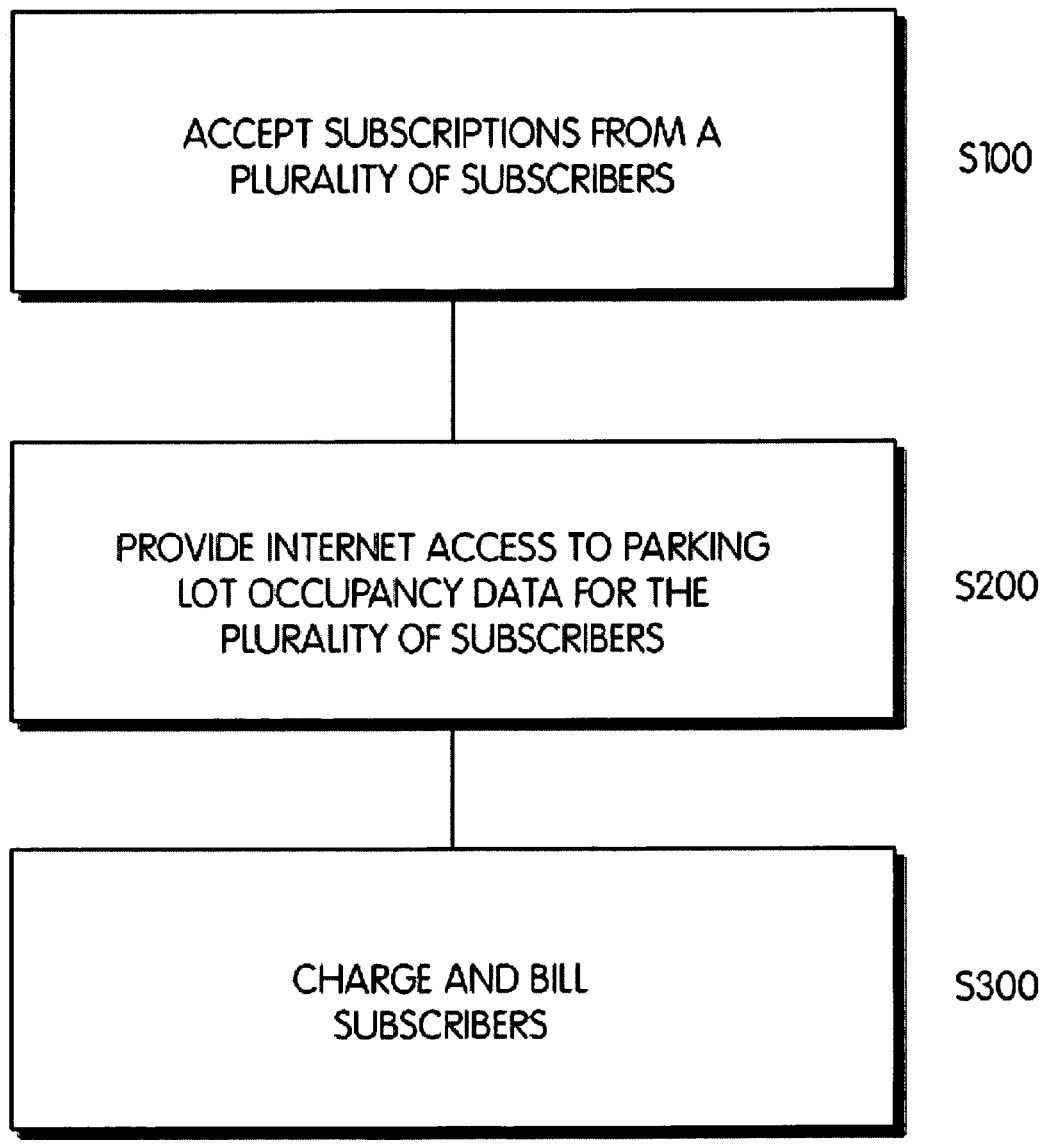
FIG. 4 is a flow chart of a communications method.

The operation of another embodiment of the present invention will now be described with reference to FIG. 4. In this embodiment of the present invention, the controller 11 commands the server 12 to accept subscriptions from a plurality of subscribers (S100). The controller 11 commands the server 12 to provide Internet accessibility to parking lot occupancy data corresponding to at least one parking lot for the plurality subscribers (S200). Subscribers may access the real-time representation through the Internet by visiting a Web site or transmitting an email request, for example. The server 12 may provide access for a fee. Accordingly, the controller 11 may command the server 12 to appropriately charge and bill subscribers (S300).

Figure 5:
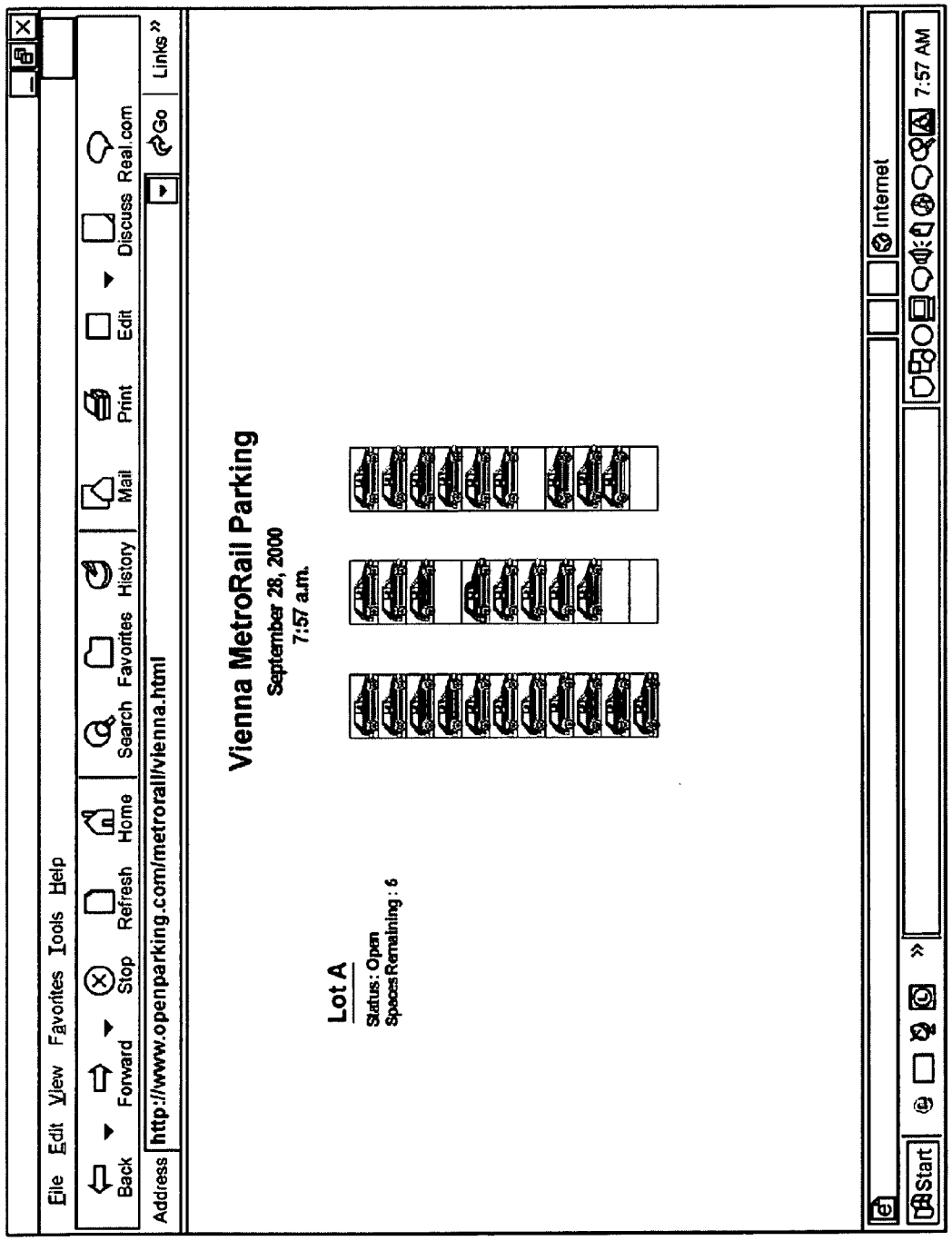
FIG. 5 is a graphical user interface.

Again, the parking lot occupancy data capable is capable of being reproduced by each of the remote display devices as a real-time representation of the parking lot indicating at least vacant parking spaces within the parking lot. The real-time representation may be in the form of a textual listing, a graphical map, a video image, an Internet Web page or a combination of such forms and may indicate occupied parking spaces as well as reserved parking spaces. FIG. 5 is one of a graphical user interface that may be displayed to a commuter.

As described above, the present invention will facilitate a commuter's search for a parking space by utilizing the capabilities of the Internet to display a real-time representation of available parking spaces within a parking lot.

It should be understood that the embodiments described above are only examples of the present invention and are not intended to limit the scope of the following claims.

What is claimed is:

1. A parking system comprising:
   an Internet-accessible Web server storing substantially real-time parking data associated with occupancy of a plurality of parking spaces, said parking data capable of being rendered by a display device running a browser application, said Web server transmitting said parking data in response to a request sent from said browser application; and
   a plurality of detectors at a parking lot communicating with said Web server, said plurality of detectors collecting substantially real-time parking occupancy data for a plurality of parking spaces at said parking lot,
   wherein each of said plurality of detectors includes:
   a wireless communications device for transmitting said substantially real-time parking occupancy data to said Web server; and
   one of a position detector, a motion detector, a weight detector, or a video camera to ascertain whether a parking space is occupied.

2. The parking system of claim 1, wherein said plurality of detectors transmits said substantially real-time parking occupancy data over a wireless local area network connection.

3. The parking system of claim 1, wherein said Web server stores billing information.

4. The parking system of claim 1, wherein said Web server stores charging information.

5. The parking system of claim 1, wherein said parking data comprises vacant parking spaces.

6. The parking system of claim 1, wherein said parking date comprises reserved parking spaces.

7. The parking system of claim 1, wherein said parking data corresponds to a plurality of parking lots.

8. The parking system of claim 1, wherein said parking data is rendered on a map.

9. The parking system of claim 8, wherein said map comprises a location of at least one available parking lot having an occupancy condition corresponding to at least one vacant parking space being present within the available parking lot.

10. The parking system of claim 8, wherein said map comprises a location of at least one available parking space within an available parking lot having an occupancy condition corresponding to at least one vacant parking space being present within the available parking lot.

11. The parking system of claim 8, wherein said map comprises a location of a reserved space within a parking lot.

12. The parking system of claim 1, wherein said parking data is accessed by visiting a Web site and said parking data is rendered in a Web page.

13. The parking system of claim 1, wherein said display device comprises a mobile computing device and said request sent over at least one wireless connection.

14. The parking system of claim 13, wherein said request is received at an intermediary server, said intermediary server retrieves said parking data from said Web server, and said intermediary server transmits said parking data to said mobile computing device.

15. The parking system of claim 13, wherein said mobile computing device comprises at least one of a mobile telephone having Internet-access and a vehicle-mounted device.

16. The parking system of claim 15, wherein said mobile computing device receives a satellite signal over a wireless satellite connection.

17. The parking system of claim 15, wherein said mobile computing device comprises a vehicle-mounted device having an interface for connection to a peripheral device.

18. The parking system of claim 17, wherein said peripheral device comprises a mobile telephone.

19. The parking system of claim 17, wherein said connection to said peripheral device comprises a wireless connection.

20. A method comprising:
  collecting substantially real-time parking occupancy data for a plurality of parking spaces at a parking lot using a plurality of detectors at said parking lot, wherein each of said plurality of detectors includes:
  a wireless communications device for transmitting said substantially real-time parking occupancy data; and
  one of a position detector, a motion detector, a weight detector, or a video camera to ascertain whether a parking space is occupied; and
  communicating said substantially real-time parking occupancy data to an Internet-accessible Web server, said Web server storing substantially real-time parking data associated with occupancy of said plurality of parking spaces, said parking data capable of being rendered by a display device running a browser application, said Web server providing said parking data to said display device in response to a receiving a request sent from said browser application.

21. A communications system comprising:
  data communications means for receiving data over a wireless connection from a server configured to provide one or more services to a subscriber; and
  display means for presenting substantially real-time information based on the data received from the data communications means, wherein:
  the server receives updated parking data over the Internet,
  the display means presents a substantially real-time occupancy condition of one or more parking lots,
  the data communications means and the display means are included within a vehicle,
  the wireless connection comprises a wireless satellite connection delivering broadcast programming,
  the server forms part of a satellite, broadcast service provider in communication with a parking system comprising a plurality of detectors configured to collect substantially real-time parking occupancy data corresponding to a plurality of parking spaces at a parking lot,
  the display means displays an indication that a parking lot includes one or more vacant spaces, and
  the indication comprises one or more of an icon, a text message, and a number corresponding to vacant spaces within the parking lot.

22. The communications system according to claim 21, wherein the display means comprises a touch screen.

23. The communications system according to claim 21, wherein the data communications means comprises a tuner.

24. The communications system according to claim 21, wherein the display means displays a map.

25. The communications system according to claim 21, wherein the parking data comprises one or more of parking occupancy information, reserved parking information, charging information, and billing information.

* * * * *